(12) United States Patent
Horimatsu et al.

(10) Patent No.: US 7,966,702 B2
(45) Date of Patent: Jun. 28, 2011

(54) EA MEMBER, AND CLIP AND STRUCTURE FOR SECURING THE SAME

(75) Inventors: Toshiyuki Horimatsu, Yokohama (JP); Kunihiko Nishiura, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/125,307

(22) Filed: May 22, 2008

(65) Prior Publication Data
US 2008/0263834 A1 Oct. 30, 2008

Related U.S. Application Data

(63) Continuation of application No. PCT/JP2006/323688, filed on Nov. 28, 2006.

(30) Foreign Application Priority Data

Dec. 14, 2005 (JP) ................................. 2005-360625

(51) Int. Cl.
- *F16B 5/06* (2006.01)
- *F16B 13/06* (2006.01)
- *B60R 21/00* (2006.01)
- *B60R 21/04* (2006.01)
- *F16B 2/20* (2006.01)
- *F16B 13/08* (2006.01)

(52) U.S. Cl. ............. 24/297; 24/458; 24/453; 296/146.7

(58) Field of Classification Search .................... 24/297, 24/453, 458; 411/508–510; 403/408.1; 52/716.7, 52/718.06, 716.5, 716.6, 716.8, 718.03, 704; 296/146.7, 39.1, 214

See application file for complete search history.

(56) References Cited

U.S. PATENT DOCUMENTS

| 5,419,606 | A | 5/1995 | Hull et al. | |
|---|---|---|---|---|
| 6,715,185 | B2 | 4/2004 | Angellotti | |
| 7,257,867 | B2 * | 8/2007 | Mizukoshi et al. | 24/297 |
| 7,257,870 | B2 * | 8/2007 | Deas et al. | 24/453 |
| 2004/0016088 | A1 * | 1/2004 | Angellotti | 24/297 |

(Continued)

FOREIGN PATENT DOCUMENTS

CN 2004-132462 4/2004

(Continued)

OTHER PUBLICATIONS

Japanese Office Action dated Dec. 9, 2008 (2 pages).

(Continued)

*Primary Examiner* — Robert J Sandy
(74) *Attorney, Agent, or Firm* — Sughrue Mion, PLLC

(57) ABSTRACT

An energy absorption (EA) member is provided with a clip, and a structure for securing the EA member. A clip 20 has a flange 21, a shaft 22 projecting from the flange 21, an anchor 23 spreading from an end of the shaft 22, a cut 24 provided in the anchor 23, and a locking section 30 projecting from the flange 21 on a side opposite the shaft 22. The locking section 30 has a cylindrical upright segment 31 standing upright from the flange 21, and a resilient locking piece 32 projecting laterally from the side surface of the upright segment 31. The EA member 1 is put on metal panel 2A or 2B while the clip 20 is inserted into a hole 4 provided in the metal panel 2A or 2B. A projecting point 40 is passed through the hole 4, to hold the EA member 1 to the metal panel.

5 Claims, 9 Drawing Sheets

U.S. PATENT DOCUMENTS

| | | |
|---|---|---|
| 2005/0017609 A1 | 1/2005 | Kucuk et al. |
| 2005/0034282 A1* | 2/2005 | Kurily et al. .................... 24/297 |
| 2005/0047860 A1 | 3/2005 | Deas et al. |
| 2005/0241118 A1 | 11/2005 | Mizukoshi et al. |
| 2006/0125286 A1 | 6/2006 | Horimatsu et al. |

FOREIGN PATENT DOCUMENTS

| | | |
|---|---|---|
| EP | 0726401 A1 | 8/1996 |
| EP | 1493932 A1 | 1/2005 |
| JP | 06-074517 U | 10/1994 |
| JP | 8-200420 A | 8/1996 |
| JP | 2001-248612 A | 9/2001 |
| JP | 2004-132462 A | 4/2004 |

OTHER PUBLICATIONS

Supplementary European Search Report dated Nov. 19, 2007.
Chinese Office Action in counterpart Chinese application, dated Jun. 1, 2010, 5 pages.

* cited by examiner

EA MEMBER, AND CLIP AND STRUCTURE FOR SECURING THE SAME

TECHNICAL FIELD

The present invention relates to EA members (energy absorption members) and to clips and structures for securing the same, and in particular to EA members suitable for application to sheet metal panels of automobile bodies and to clips and structures for securing the same.

BACKGROUND ART

Sheet metal panels serving as automobile door bodies are provided with EA members made of rigid urethane foam for the purpose of energy absorption (EA) in the likelihood of side-on collision. As a method for securing an EA member made of rigid urethane foam to a door-body sheet metal panel, a structure shown in FIGS. 12a to 13b has been disclosed in Japanese Unexamined Patent Application Publication No. 2004-132462.

FIG. 12a is a substantially horizontal cross-sectional view showing an EA-member securing structure disclosed in the aforementioned document. FIG. 12b is a side view of a locking member included in the EA-member securing structure. FIG. 13a is a cross-sectional view for describing a method for manufacturing an EA member provided with the locking member. FIG. 13b is an enlarged view of a part shown in FIG. 13a.

As shown in FIGS. 12a and 12b, a plate-like EA member 1 made of synthetic resin such as rigid urethane foam is secured with a clip 3 to a component serving as a body sheet metal panel (a door trim in this case) 2. As a lock catching part, a hole 4 is provided in the body sheet metal panel 2. The clip 3 is caught in the hole 4.

The clip 3 has a cylindrical body 6, an anchor 5 projecting outward like a collar from the bottom of the cylindrical body 6, a flange 7 projecting outward like a collar from the top of the cylindrical body 6, and a plurality (two in this embodiment) of projections 8 and 8 projecting in a direction parallel to the cylinder axis of the cylindrical body 6 from the top end face of the cylindrical body 6. The projections 8 and 8 are provided opposite each other in the diametrical direction of the hole 4.

On a side face of each projection 8 with respect to a direction in which the projection 8 projects, a catch 8a projects laterally with a space 9 being provided between the catch 8a and the flange 7. The amount of the lateral projection of the catch 8a gradually becomes larger toward the flange 7. That is, the outer sides of the projections 8 and 8 are tapered. This enables easy insertion of the projections 8 and 8 into the hole 4.

The clip 3 is made of synthetic resin and is generally molded as an integral body. The projections 8 and 8 are resiliently deformable toward each other.

Additionally, in the synthetic resin forming the clip 3, ferromagnetic particles such as ferrite particles are dispersed. Further, the clip 3 is in the magnetized state because of magnetization performed on the ferromagnetic particles. Thus, the clip 3 can be magnetically attracted to and held by a mold used for molding the EA member 1.

As shown in FIGS. 12a and 12b, the cylindrical body 6 and the anchor 5 of the clip 3 are embedded in the EA member 1. In this embodiment, the bottom surface of the flange 7 is flush with the surface of the EA member 1. Alternatively, the top surface of the flange 7 may be flush with the surface of the EA member 1. It is also allowable that the lower half of the flange 7 is embedded in the EA member 1 while the upper half of the flange 7 projects from the surface of the EA member 1. However, if the flange 7 projects from the surface of the EA member 1 as in the case shown in FIG. 12, for example, the positional relationship between the EA member 1 and the body sheet metal panel 2 in a direction toward and away from each other would be uniquely defined by pinching the body sheet metal panel 2 between the flange 7 and the catches 8a.

By putting the EA member 1 provided with the clip 3 on the body sheet metal panel 2 while inserting the projections 8 and 8 into the hole 4, the EA member 1 is secured to the body sheet metal panel 2. When the EA member 1 is pressed against the body sheet metal panel 2, the projections 8 and 8 are pushed into the hole 4. Since the catches 8a are pressed against the inner periphery of the hole 4, the projections 8 and 8 are bent toward each other and thus are inserted into the hole 4. After the catches 8a have passed through the hole 4, the projections 8 and 8 resiliently restore their original shapes and the sides of the projections 8 are resiliently pressed against the inner periphery of the hole 4, whereby the periphery of the hole 4 being fitted in the space 9 is pinched between the flange 7 and the catches 8a. In this manner, the EA member 1 is secured to the body sheet metal panel 2.

To manufacture the EA member 1 provided with the clip 3, a mold constituted by a lower mold 10 and an upper mold 11 is used as shown in FIGS. 13a and 13b. While the clip 3 is made to be held in a surface of the upper mold 11 facing a cavity, a synthetic resin material is supplied into the cavity and is molded. In the case of using urethane or the like, a formulated concentrate of urethane or the like is supplied into the lower mold 10 and is caused to foam.

The upper mold 11 that holds the clip 3 has a recess 12 that receives the projections 8 and 8 of the clip 3. In addition, a ring member 13 made of a ferromagnetic material (for example, an alloy such as an iron-cobalt alloy or a ceramic material such as ferrite) is provided at the mouth of the recess 12. By magnetizing one of the ring member 13 and the clip 3, the clip 3 can be magnetically attracted to and held by the ring member 13.

After the top surface of the flange 7 is magnetically attracted to and held by the bottom surface of the ring member 13, the above-described molding is performed. After the synthetic resin is hardened to a predetermined degree in the mold, the molded material is removed from the mold. Thus, the EA member 1 with the clip 3 can be obtained. Patent Document 1: Japanese Unexamined Patent Application Publication No. 2004-132462

The clip 3 shown in FIGS. 12a to 13b can only be applied to the body sheet metal panel 2 whose thickness matches the space between the flange 7 and the catches 8a.

That is, if the body sheet metal panel 2 is thicker than that shown in FIGS. 12a and 12b, the catches 8a cannot completely pass through the hole 4 and therefore the EA member 1 cannot be locked to the body sheet metal panel 2. In contrast, if the body sheet metal panel 2 is thinner than that shown in FIGS. 12a and 12b, the EA member 1 wobbles.

DISCLOSURE OF INVENTION

The present invention aims to solve such problems in the conventional art and to provide a clip capable of firmly securing an EA member even if the thickness of a component such as a vehicle-body sheet metal panel is changed, an EA member provided with such a clip, and a structure for securing such an EA member.

A first aspect provides a clip for securing an attachment to a securing plate. The clip includes a head to be embedded in the attachment, a flange to be exposed above the securing plate, and a leg extending downward from the flange. The leg includes a substantially cylindrical main leg and a resilient locking piece. The main leg has at a tip thereof a plurality of projecting portions. The resilient locking piece extends in a direction of a length of the main leg, is connected at an upper portion thereof to the main leg, and has at a bottom thereof a free end. The resilient locking piece further includes in an upper portion thereof a sloping surface diverging downward, in a lower portion thereof a sloping surface diverging upward, and a steep sloping portion near a point where the sloping surfaces meet.

A second aspect provides a clip for securing an EA member to a component. The clip includes a flange to be positioned at a surface of the EA member, a shaft projecting from the flange toward an EA-member side, an anchor spreading from an end of the shaft and to be embedded in the EA member, and a locking section projecting from the flange on a side opposite the shaft and configured to lock the clip in the component. The locking section includes an upright segment standing upright from the flange, and a locking piece laterally projecting from a side surface of the upright segment and resiliently thrustable and retractable in a projecting direction of the locking piece. The locking piece extends parallel to a direction in which the upright segment stands upright. The locking piece forms in a portion halfway in an extending direction thereof a most projecting point projecting farthest in the lateral direction, in a portion thereof near a tip of the upright segment with respect to the most projecting point a first slope whose amount of projection gradually becomes smaller toward the tip, and in a portion thereof near the flange with respect to the most projecting point a second slope whose amount of projection gradually becomes smaller toward the flange.

In the second aspect, the upright segment may be cylindrical and have in the side surface thereof an opening, and the locking piece may be resiliently connected to a portion of a periphery of the opening, the portion being farthest from the flange.

The upright segment may have along a periphery thereof the locking piece in a plurality with intervals therebetween.

The anchor may have a cut therein, the cut having a shape made by cutting off an outer peripheral portion of the anchor.

A third aspect provides an EA member integrally provided with the clip according to the first or second aspect. The flange of the clip is positioned at a surface of the EA member, the locking section projects from the EA member, and the anchor is embedded in the EA member.

A fourth aspect provides an EA-member securing structure in which the EA member according to the third aspect is secured to a component. The EA member is secured to the component while the locking piece of the clip is caught by a lock catching part provided to the component.

In the fourth aspect, the lock catching part may be a hole. In this case, the second slope of the clip may be locked at an edge of the hole remote from the EA member.

In the fourth aspect, the component may be a vehicle-body sheet metal panel.

The EA member may be made of synthetic resin such as rigid urethane.

BRIEF DESCRIPTION OF DRAWINGS

FIG. 13b is an enlarged view of a part shown in FIG. 13a.

DETAILED DESCRIPTION OF THE INVENTION

The securing clip according to the first aspect used for securing a buffer or an energy absorber made of a foam material or the like to a securing plate has at its end a plurality of projecting portions for locating a hole. In inserting the securing clip into a through hole bored in the securing plate, the hole can be located easily even at a securing site having bad accessibility.

Further, the resilient locking piece of the clip according to the first aspect has a sloping surface diverging from a lower position toward a central position thereof, and a peak point at the outermost position in the sloping surface. The locking piece also has a steep sloping portion of a short length immediately above the peak forming the largest diameter, and, as an extension of the steep sloping portion, another sloping surface converging toward the flange. Once inserted, the securing clip is drawn in by using the sloping surfaces of the resilient locking piece having a restoring force, whereby the clip assuredly moves to the final securing position. A securing worker can easily recognize the completion of the securing work by touch.

The clip according to the second aspect has the most projecting point halfway in the locking piece. The second slope is provided near the flange with respect to the most projecting point. The clip can be applied to a component, such as a vehicle-body sheet metal panel, having a thickness that allows the second slope to be in contact with an edge (an edge opposite an edge on the EA-member side) of a hole provided in the component.

The first slope provided near the tip with respect to the foregoing slope is brought into contact with the inner periphery of the hole while the locking section of the clip is being inserted into the hole in the component. During the insertion, the locking piece gradually retracts. After the most projecting point of the clip has passed through the hole, the second slope is locked at the edge of the hole.

Figure 11:
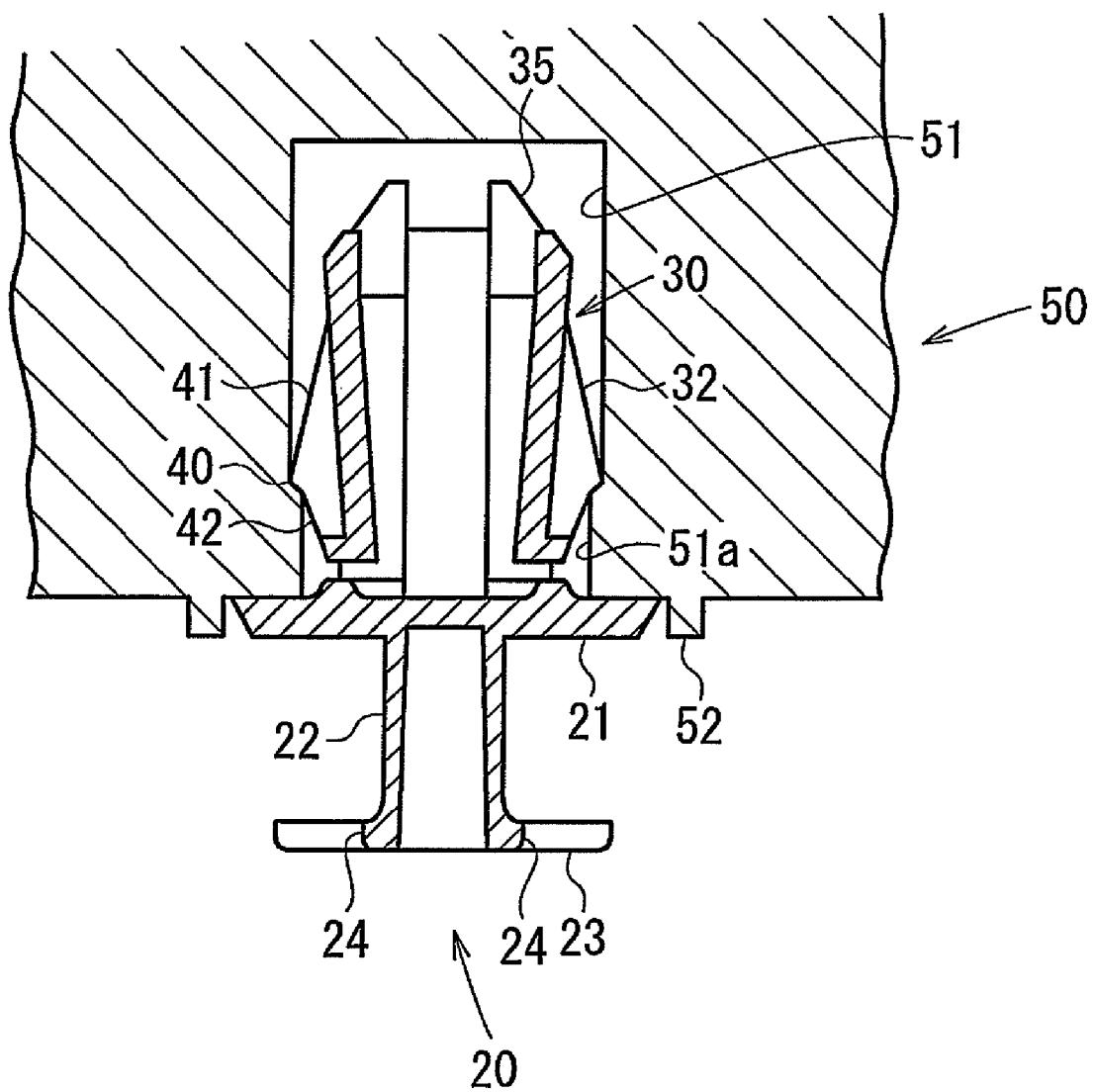
FIG. 11 is a cross-sectional view showing a state where the clip is fitted in a mold.
Figure 12A:
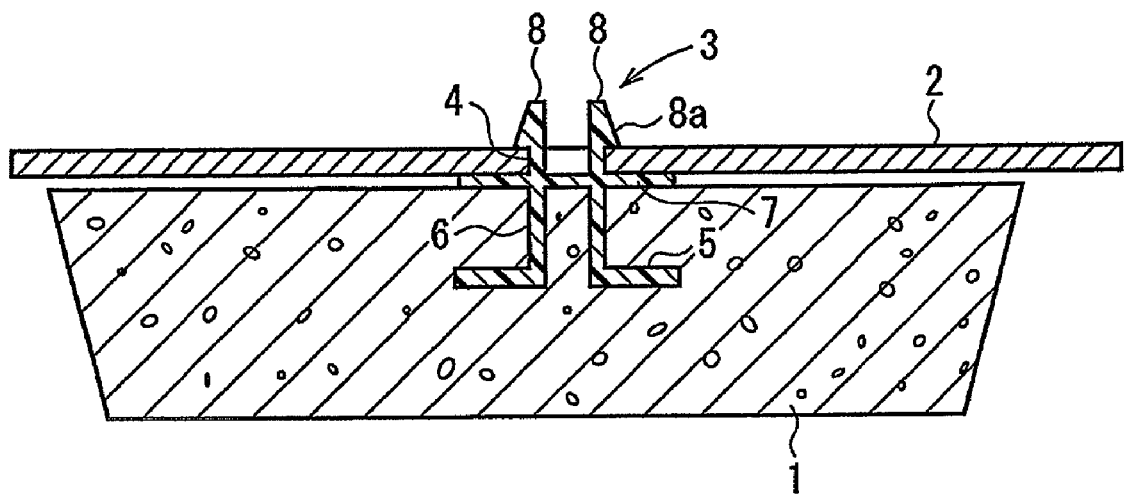
FIG. 12a is a cross-sectional view showing an EA-member securing structure disclosed in the conventional example.
Figure 12B:
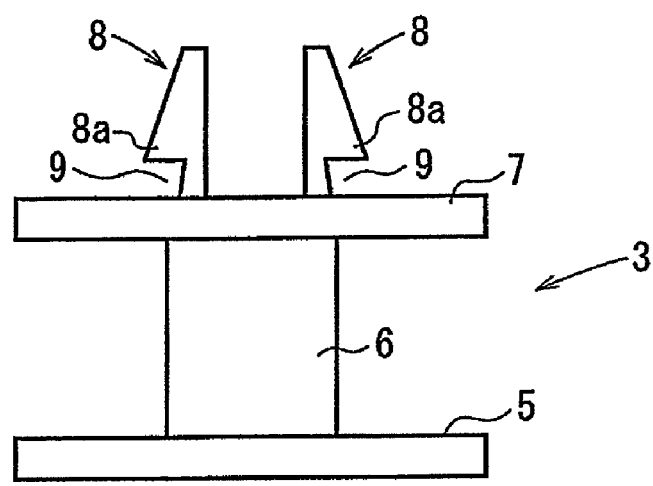
FIG. 12b is a side view of a clip included in the EA-member securing structure.
Figure 13A:
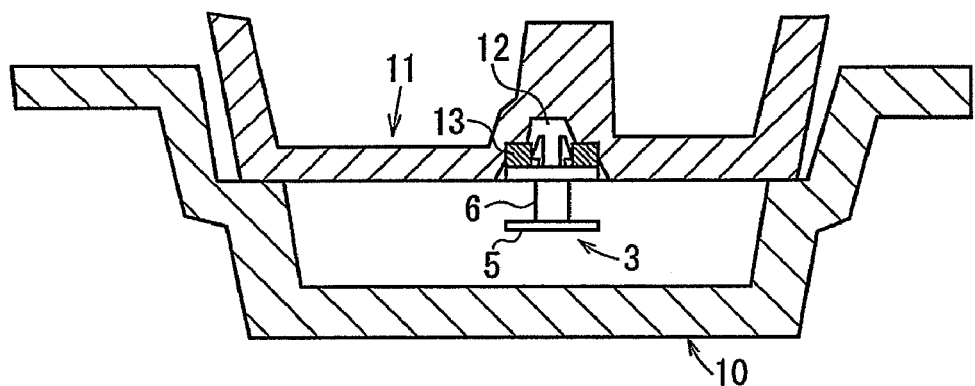
FIG. 13a is a cross-sectional view for describing a method for manufacturing an EA member provided with the clip in the conventional example.
Figure 13B:
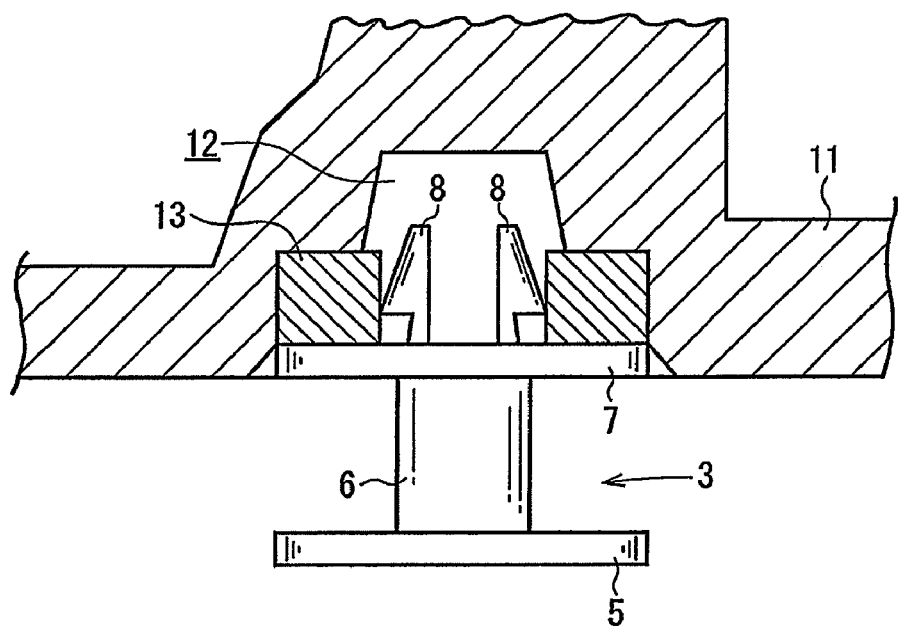

When the clip is fitted into a mold for molding the EA member with the clip, a tactile click sensation is provided at the passage of the most projecting point through the mouth of a clip holding hole provided in the mold. Therefore, it is easy for a molding worker to recognize the completion of fitting of the clip. This will be described in detail below in an embodiment, with reference to a drawing (FIG. 11).

Now, an embodiment will be described with reference to the drawings.

Figure 1:
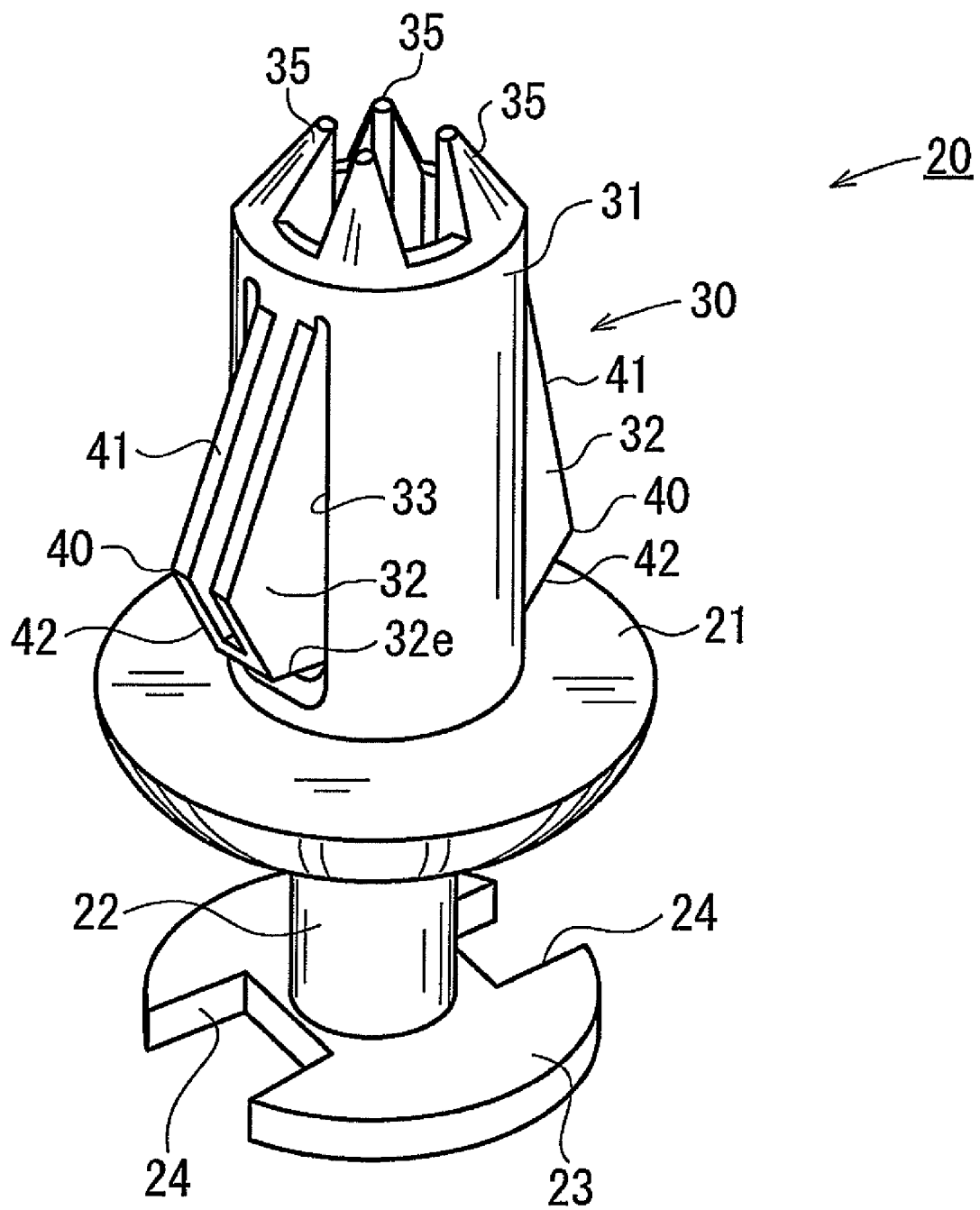
FIG. 1 is a perspective view of a clip according to an embodiment.
Figure 2:
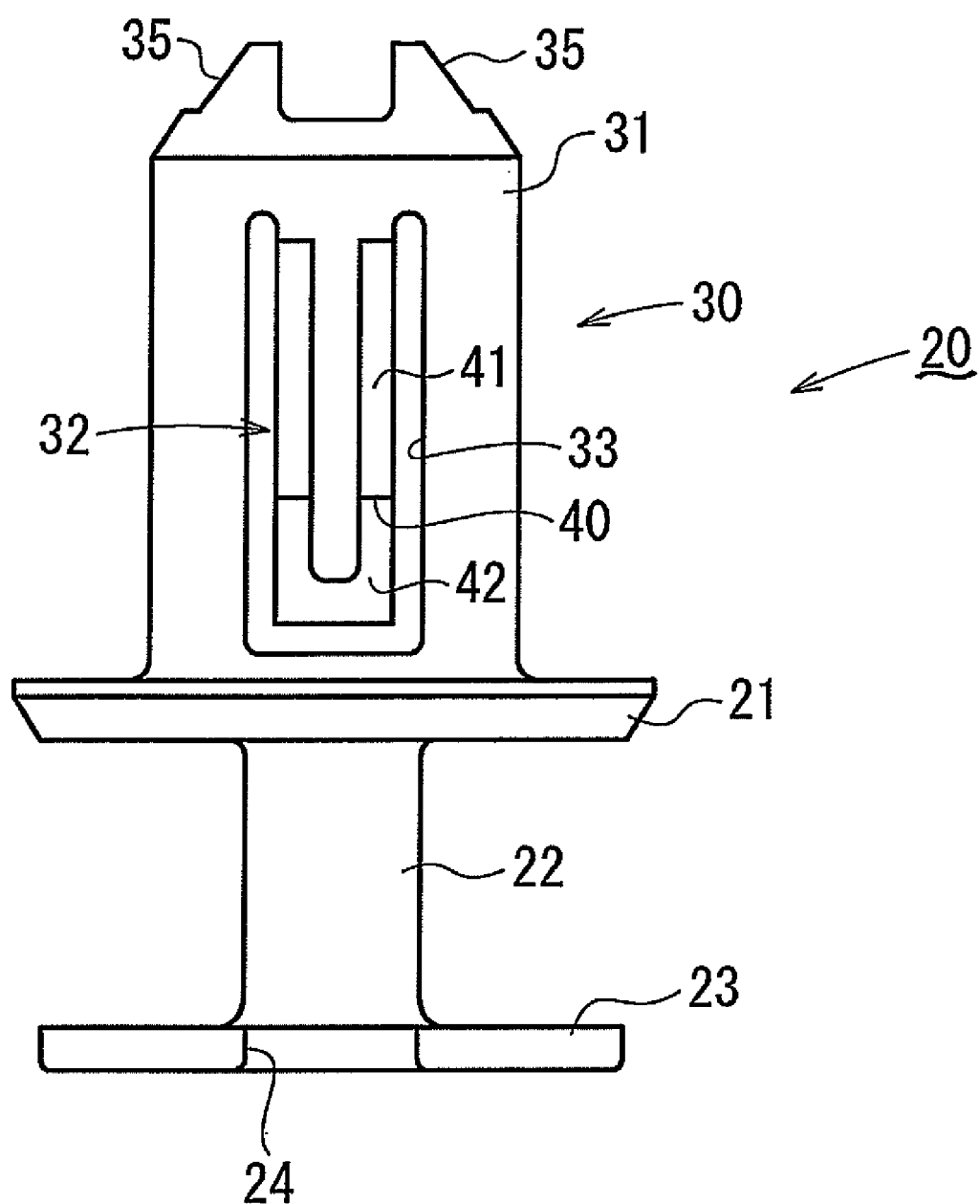
FIG. 2 is a front view of the clip shown in FIG. 1.
Figure 3A:
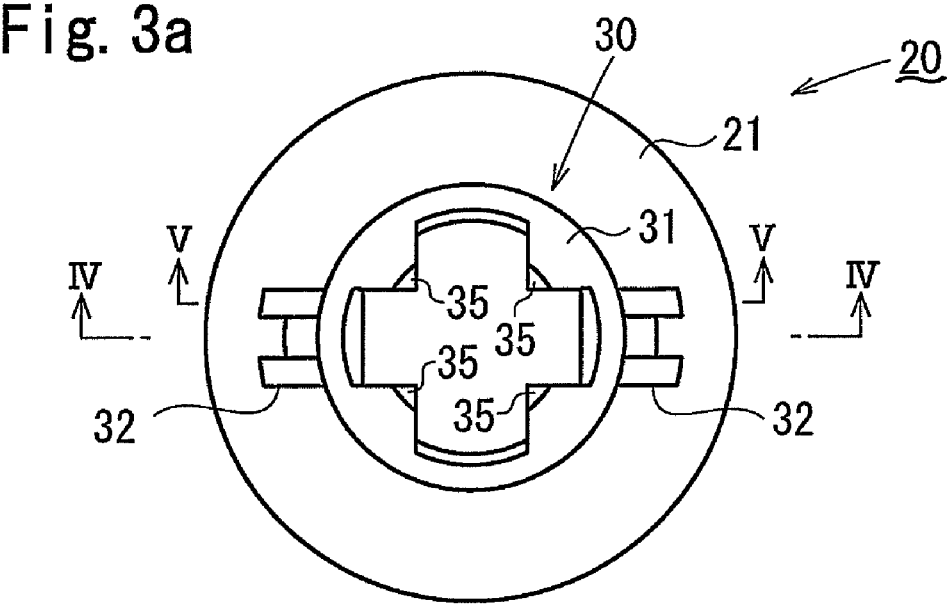
FIG. 3a is a plan view of the clip shown in FIG. 1.
Figure 3B:
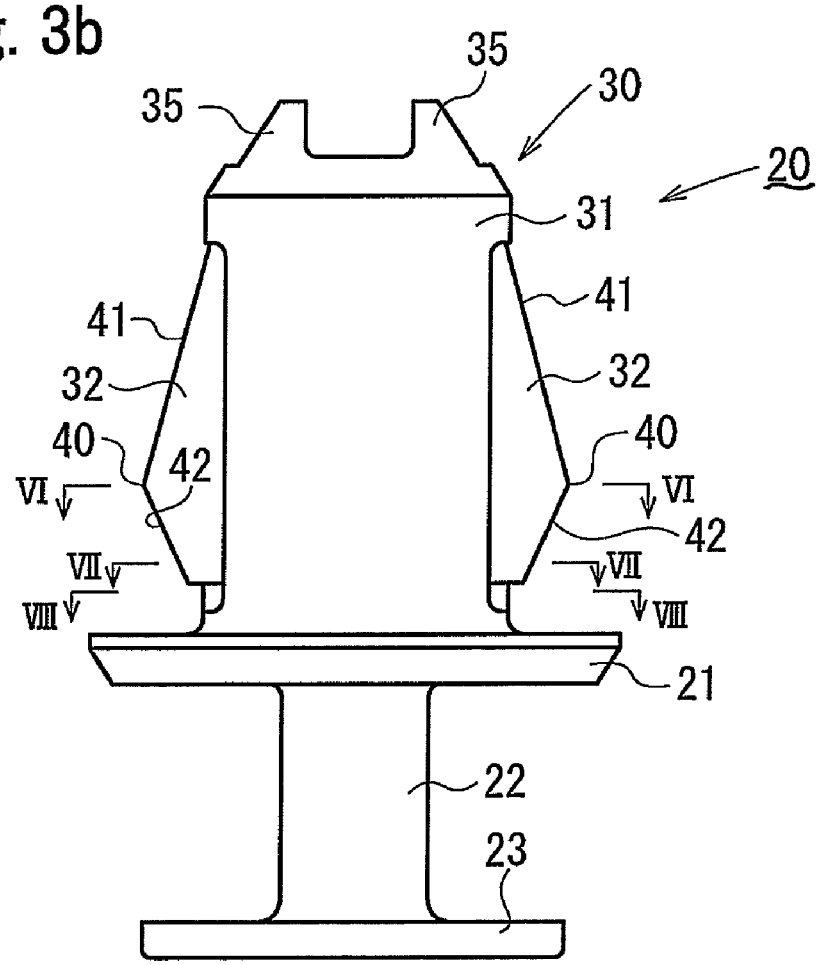
FIG. 3b is a side view of the clip shown in FIG. 1.
Figure 4:
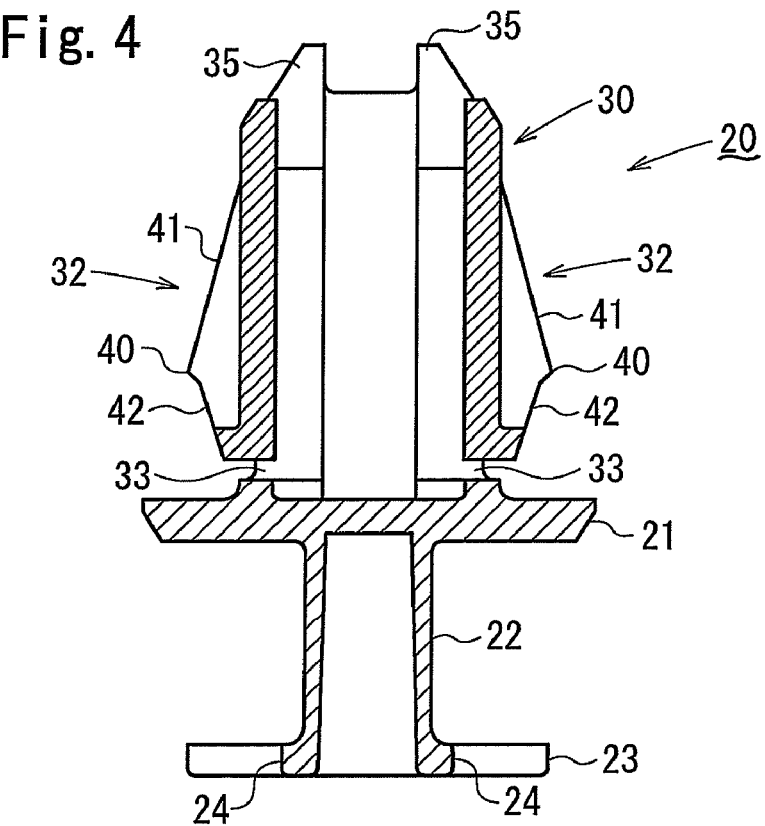
FIG. 4 is a cross-sectional view of FIG. 3a taken along the line IV-IV.
Figure 5:
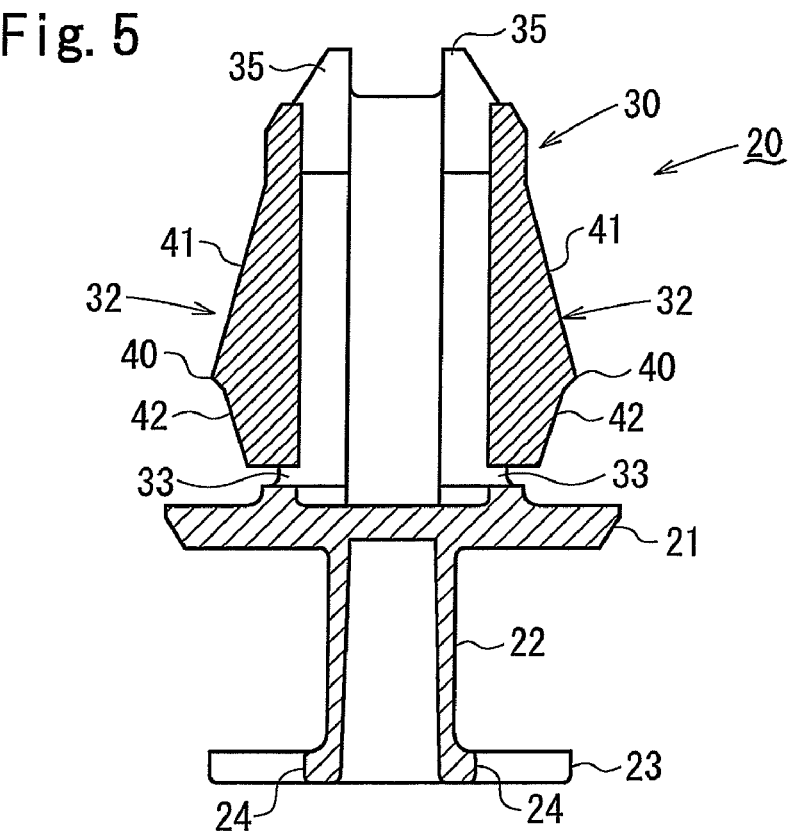
FIG. 5 is a cross-sectional view of FIG. 3a taken along the line V-V.
Figure 6:
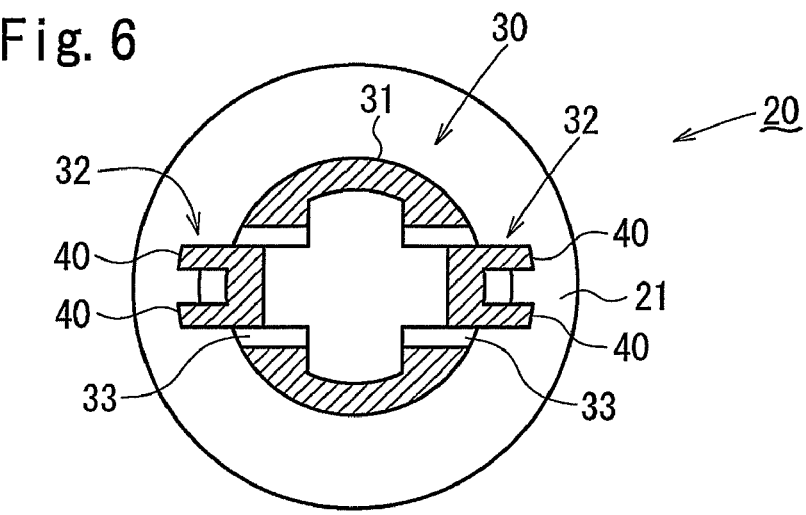
FIG. 6 is a cross-sectional view of FIG. 3b taken along the line VI-VI.
Figure 7:
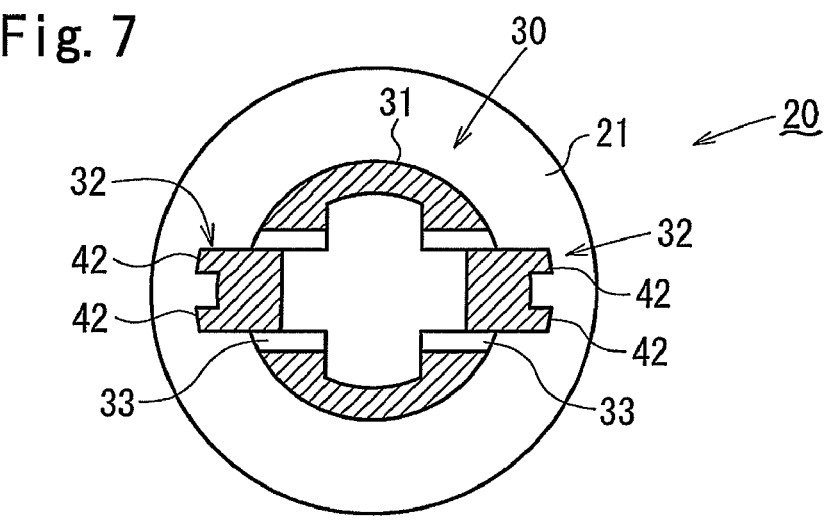
FIG. 7 is a cross-sectional view of FIG. 3b taken along the line VII-VII.
Figure 8:
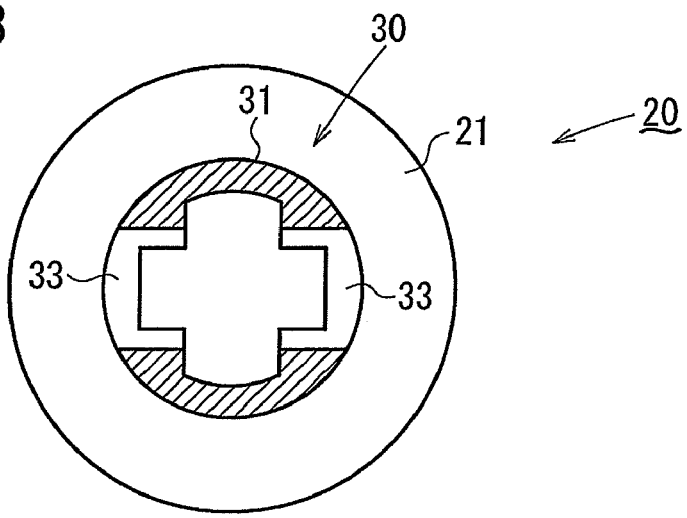
FIG. 8 is a cross-sectional view of FIG. 3b taken along the line VIII-VIII.
Figure 9:
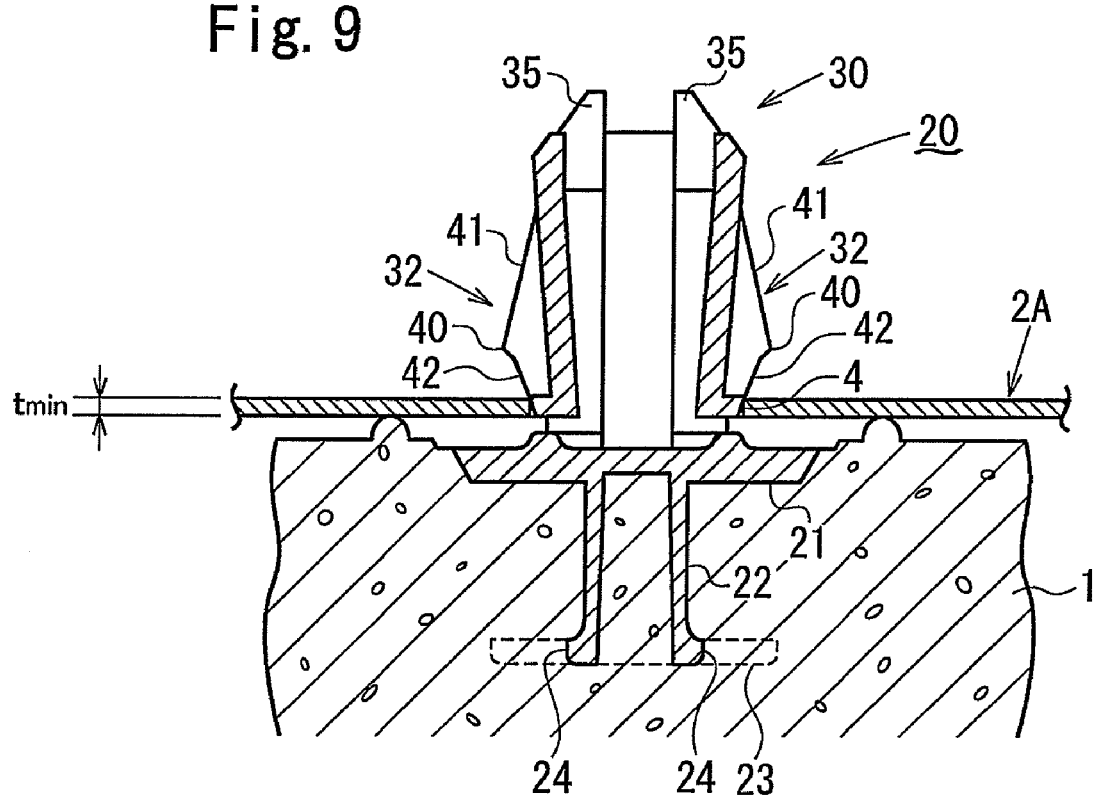
FIG. 9 is a cross-sectional view showing an EA-member securing structure in the case of a vehicle-body sheet metal panel having a small thickness.
Figure 10:
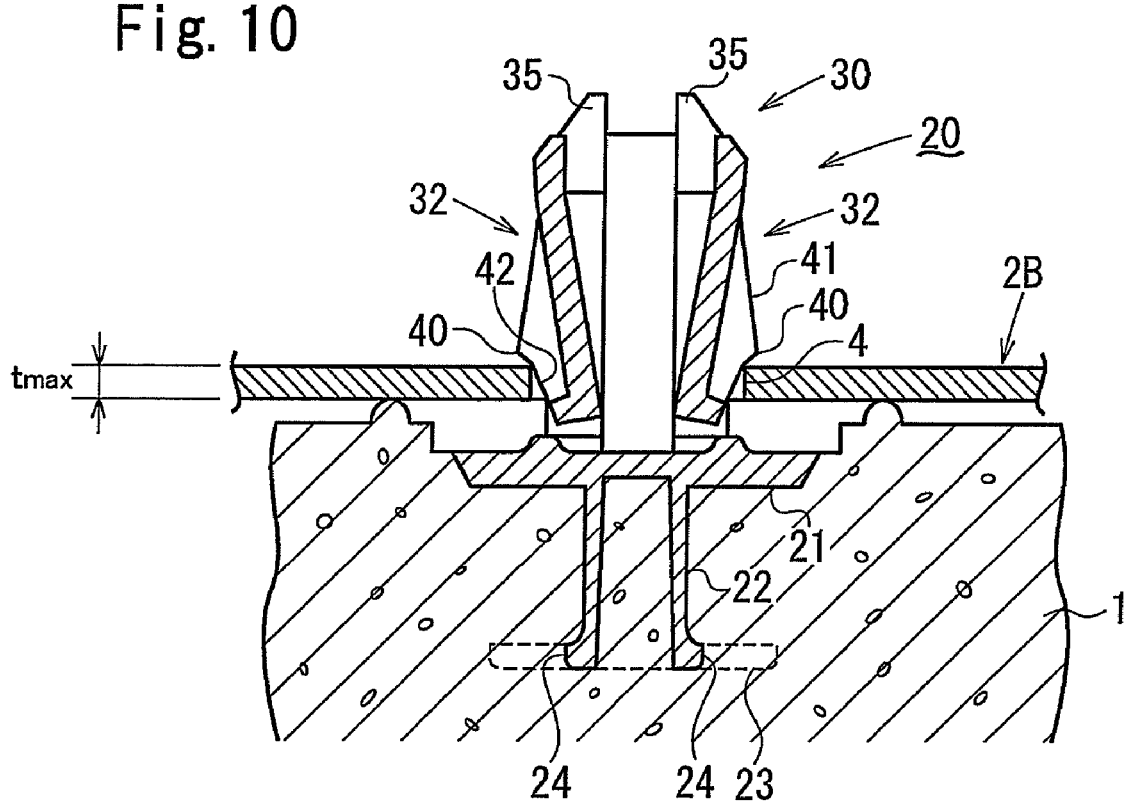
FIG. 10 is a cross-sectional view showing the EA-member securing structure in the case of a vehicle-body sheet metal panel having a large thickness.

FIG. 1 is a perspective view of a clip according to the embodiment. FIG. 2 is a front view of the clip shown in FIG. 1. FIG. 3a is a plan view of the clip shown in FIG. 1. FIG. 3b is a side view of the clip shown in FIG. 1. FIG. 4 is a cross-sectional view of FIG. 3a taken along the line IV-IV. FIG. 5 is a cross-sectional view of FIG. 3a taken along the line V-V. FIG. 6 is a cross-sectional view of FIG. 3b taken along the line VI-VI. FIG. 7 is a cross-sectional view of FIG. 3b taken along the line VII-VII. FIG. 8 is a cross-sectional view of FIG. 3b taken along the line VIII-VIII. FIG. 9 is a cross-sectional view showing an EA-member securing structure in the case of a vehicle-body sheet metal panel having a small thickness. FIG. 10 is a cross-sectional view showing the EA-member securing structure in the case of a vehicle-body sheet metal panel having a large thickness. FIG. 11 is a cross-sectional view showing a state where the clip is fitted in a mold.

A clip 20 is made of synthetic resin and is molded as an integral body. The clip 20 has a flange 21 to be positioned at the surface of an EA member, a shaft 22 projecting from the flange 21 toward an EA-member side, an anchor 23 spreading from an end of the shaft 22 and to be embedded in the EA member, cuts 24 provided in the anchor 23, and a locking section 30 projecting from the flange 21 on a side opposite the shaft 22.

The locking section 30 has a cylindrical upright segment 31 standing upright from the flange 21, and locking pieces 32 projecting laterally from the side surface of the upright segment 31 and resiliently thrustable and retractable in their projecting direction.

The locking pieces 32 extend parallel to a direction in which the upright segment 31 stands upright. Each locking piece 32 has a most projecting point 40 projecting farthest in the lateral direction, halfway in a direction in which the locking piece 32 extends. A portion of the locking piece 32 near the tip of the upright segment 31 with respect to the most projecting point 40 forms a first slope 41 whose amount of projection gradually becomes smaller toward the tip. A portion of the locking piece 32 near the flange 21 with respect to the most projecting point 40 forms a second slope 42 whose amount of projection gradually becomes smaller toward the flange 21.

The angle at which the first slope 41 and the cylinder axis of the upright segment 31 cross each other is preferably about 15 to 25 degrees. The angle at which the second slope 42 and the cylinder axis of the upright segment 31 cross each other is preferably about 20 to 30 degrees.

The bottom of the locking piece 32, i.e., the surface nearest to the flange 21 in the drawing, forms a bottom end face 32e parallel to the flange 21. The distance (interval) between the bottom end face 32e and the flange 21 is preferably about 1 to 5 mm.

The side surface of the cylindrical upright segment 31 has two openings 33 extending parallel to the cylinder axis. Each locking piece 32 is resiliently connected to a portion of the periphery of the corresponding one of the openings 33 and 33, the portion being farthest from the flange 21.

In this embodiment, two openings 33 and two locking pieces 32 are provided in and to the upright segment 32 in such a manner as to be respectively positioned opposite each other diametrically. Alternatively, three or more openings 33 and three or more locking pieces 32 may be provided in and to the upright segment 31 along the peripheral surface of the upright segment 31 with intervals therebetween. It is practical to set the number of locking pieces 32 to about 2 to 4.

The top of the upright segment 31 is tapered off. The cylindrical upright segment 31 has a cylindrical peripheral surface but a cruciform hollow inside. This forms four projections 35 at the top of the upright segment 31.

As shown in FIGS. 9 and 10, the shaft 22 and the anchor 23 of the clip 20 are embedded in an EA member 1 in such a manner that the flange 21 is positioned at the surface of the EA member 1 and that the locking section 30 projects from the EA member 1.

To secure the EA member 1 having the clip 20 provided as described above to a body sheet metal panel 2A or 2B as shown in FIGS. 9 and 10, the EA member 1 is put on the body sheet metal panel 2A or 2B while the clip 20 is introduced into a hole 4 provided in the body sheet metal panel 2A or 2B. The locking pieces 32 of the clip 20 are pressed against the inner periphery of the hole 4. As the clip 2 is pushed into the hole 4, the locking pieces 32 gradually retract into their respective openings 33 while approaching each other diametrically. After the passage of the most projecting points 40 through the hole 4, with a resilient force of the locking pieces 32 to restore their original shapes, the second slopes 42 are pressed against an edge of the hole 4 remote from the EA member 1. This causes the body sheet metal panel 2A or 2B to be pinched between the flange 21 and the second slopes 42, whereby the EA member 1 is fitted to and held by the body sheet metal panel 2A or 2B.

In either case of the body sheet metal panel 2A that is relatively thin as shown in FIG. 9 or the body sheet metal panel 2B that is relatively thick as shown in FIG. 10, the EA member 1 can be firmly held by the body sheet metal panel 2A or 2B as long as the edge of the hole 4 remote from the EA member 1 is brought into contact with the second slopes 42.

The EA member 1 provided with the clip 20 is manufactured by performing molding with the clip 20 being held in an inner surface of an EA-member mold 50 as shown in FIG. 11. This mold has a clip holding hole 51 provided therein so as to face a cavity. The mouth of the hole 51 forms a small-diameter portion 51a.

The clip 20 is fitted by pushing the locking section 30 into the hole 51. In this step, a tactile click sensation is provided when the most projecting points 40 pass through the small-diameter portion 51a. This enables a molding worker to recognize that the clip 20 has been pushed into the hole 51 sufficiently when fitting the clip 20 into the hole 51.

The anchor 23 of the clip 20 has the cuts 24. Therefore, when molding of the EA member is performed as shown in FIG. 11, a sufficient amount of resin such as urethane is supplied between the flange 21 and the anchor 23, whereby the clip 20 can be firmly integrated with the EA member.

Further, the first slopes 41 are formed allowing for the thickness of the securing plate. In addition, the bottom surface of the flange 21 are brought near to the top surface of the securing plate.

By providing a step in each locking piece 32, a securing worker can recognize the completion of the securing work and thus incomplete securing work can be prevented.

A plurality of the projections 35 provided at the tip of the clip 20 help location of the securing hole. Even in the case of bad accessibility, the hole can be located quickly. This improves workability.

While the present invention has been described in detail by taking a specific embodiment as an example, it is apparent to those skilled in the art that various changes can be made thereto without departing from the intended scope of the present invention.

The present invention claims the benefit of Japanese Patent Application (Japanese Unexamined Patent Application Publication No. 2005-360625) filed Dec. 14, 2005, which is hereby incorporated by reference herein in its entirety.

The invention claimed is:

1. An energy absorption member securing structure in which an energy absorption member is secured to a component by a clip,
    wherein the clip comprises:
        a flange to be positioned at a surface of the energy absorption member;
        a shaft projecting from the flange toward an energy absorption member side;
        an anchor spreading from an end of the shaft and to be embedded in the energy absorption member; and
        a locking section projecting from the flange on a side opposite the shaft and configured to lock the clip in the component,
    wherein the locking section includes an upright segment standing upright from the flange, and a locking piece laterally projecting from a side surface of the upright segment and resiliently thrustable and retractable in a projecting direction of the locking piece,
    wherein the locking piece extends parallel to a direction in which the upright segment stands upright,
    wherein the locking piece is formed into a projecting point projecting in the lateral direction;
    wherein, in a portion of the locking piece near a tip of the upright segment with respect to the projecting point, a first slope whose amount of projection gradually becomes smaller toward the tip is provided; and
    wherein, in a portion of the locking piece near the flange with respect to the projecting point, a second slope whose amount of projection gradually becomes smaller toward the flange is provided;
    wherein the component comprises:
        a hole that locks with the locking section by inserting the upright segment through the hole such that the second slope locks with an edge of the hole remote from the energy absorption member;
    wherein a height extending from a lowest point of the second slope to the projecting point is greater than a thickness of the component; and
    wherein the locking piece has a third slope between the projecting point and the second slope, the third slope having a different inclination than the second slope.

2. The energy absorption member securing structure according to claim 1, wherein the component is a vehicle-body sheet metal panel.

3. The energy absorption member securing structure according to claim 1, wherein the energy absorption member is made of synthetic resin.

4. The energy absorption member securing structure according to claim 1, wherein the anchor has a cut therein, the cut having a shape made by cutting off an outer peripheral portion of the anchor.

5. The energy absorption member securing structure according to claim 1, wherein the upright segment has, at a tip thereof, a plurality of projecting portions.

* * * * *